United States Patent [19]
Krow

[11] 4,450,075
[45] May 22, 1984

[54] MAGNETIC OIL FILTER INSERT

[76] Inventor: Cecil J. Krow, P.O. Box 249, Ralston, Okla. 74650

[21] Appl. No.: 489,449

[22] Filed: Apr. 28, 1983

[51] Int. Cl.³ .............................................. B01D 35/06
[52] U.S. Cl. ..................................... 210/223; 210/232
[58] Field of Search ............... 210/695, 222, 223, 232, 210/168, 295, 441, 442, 443, 444, 457, 458

[56] References Cited

U.S. PATENT DOCUMENTS

| | | | |
|---|---|---|---|
| 2,149,764 | 3/1939 | Frei | 210/223 |
| 2,366,451 | 1/1945 | McNeal | 210/223 |
| 2,652,925 | 9/1953 | Vermeiren | 210/222 |
| 2,976,999 | 3/1961 | Paton | 210/223 |
| 2,980,257 | 4/1961 | Paton | 210/223 |
| 3,034,651 | 5/1962 | Morrell | 210/222 |
| 3,289,841 | 12/1966 | Quintin | 210/223 |
| 3,447,687 | 6/1969 | Canterbury | 210/232 |
| 3,762,135 | 10/1973 | Ikebe | 210/223 |
| 4,026,805 | 5/1977 | Fowler | 210/223 |
| 4,053,409 | 10/1977 | Kuhfuss | 210/223 |
| 4,371,439 | 2/1983 | Thornton | 210/223 |

FOREIGN PATENT DOCUMENTS 855928 12/1960 United Kingdom ............... 210/222

Primary Examiner—Ernest G. Therkorn
Attorney, Agent, or Firm—Robert K. Rhea

[57] ABSTRACT

A generally cylindrical magnetic oil filter unit adapted to be interposed in an engine lubricating oil filter or other oil containing compartment for removal of magnetizable particles entrained or suspended in the oil. The filter unit is formed by a plurality of bar-type permanent magnets slidably surrounding an elongated support rod and maintained in spaced-apart relation by like poles facing each other. One end of the magnet support rod is supported by an oil filter support head for maintaining the magnetic filter in spaced relation with respect to surrounding components.

2 Claims, 6 Drawing Figures

U.S. Patent  May 22, 1984  4,450,075
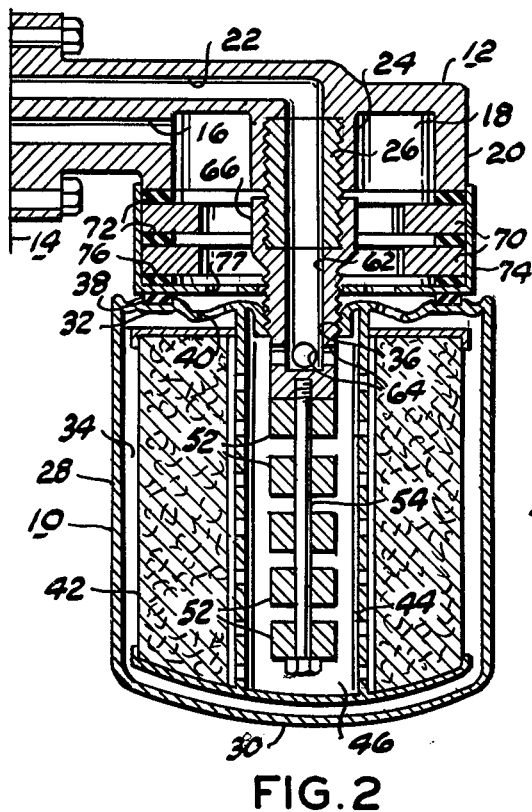
FIG.2
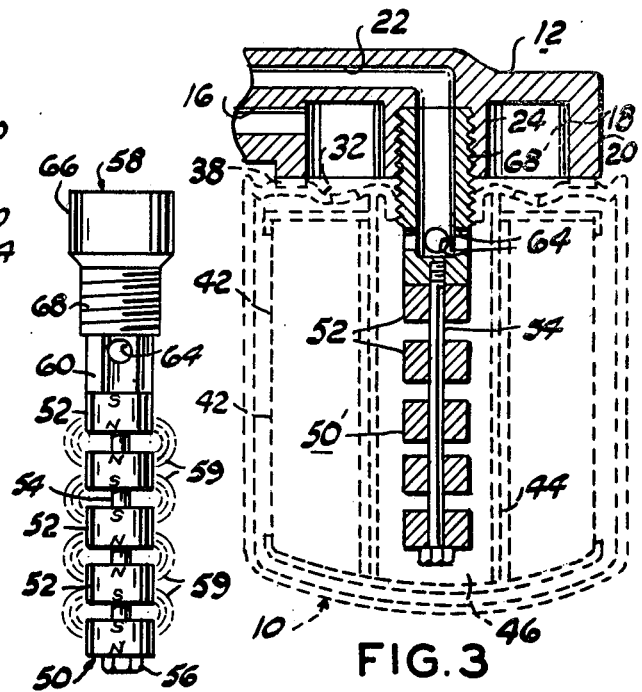
FIG.1
FIG.3
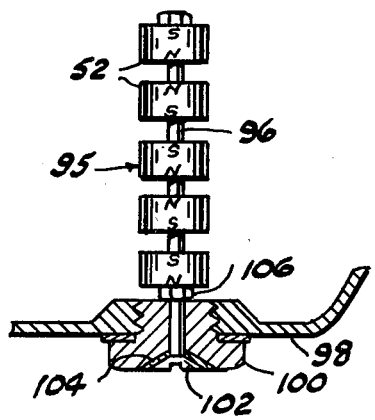
FIG.6
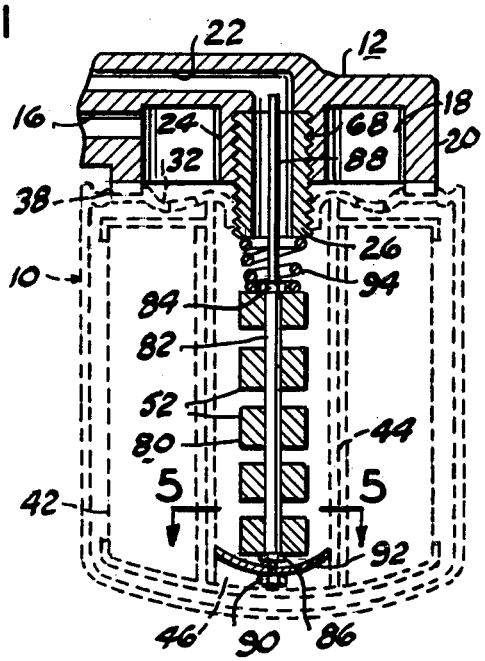
FIG.4
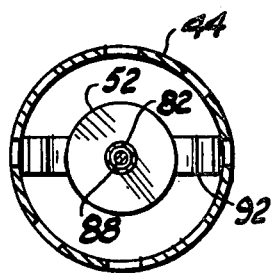
FIG.5

MAGNETIC OIL FILTER INSERT

BACKGROUND OF THE INVENTION

1. Field of the Invention

The present invention relates to oil filters of the type used for filtering the lubricating oil of internal combustion engines, or the like, and more particularly to a magnetic insert for an oil filter or lubricating oil containing compartment through which the oil is circulated for attracting magnetizable particles contained by the oil.

It is well known that metallic particles, separated from the bearings or other moving parts of an engine, are for the most part suspended by the oil and moved through the lubricating conductors of the engine to the parts to be lubricated wherein the metallic particles further increase the wear or damage of closely mating parts. Oil filters through which the lubricating oil is circulated remove the larger metallic particles, however, for the most part minute metallic particles pass through the filtering element and remain in suspension. It is, therefore, desirable that a magnetic element be placed in the filter or oil compartment through which the lubricating oil is circulated by an oil pump to remove magnetizable particles and increase the life of the engine.

2. Description of the Prior Art

Prior patents generally disclose a number of magnetic devices for attracting magnetizable particles suspended in lubricating oil in which the magnetic device is secured to the outer wall surface of an oil filter casing to magnetize the metallic case and attract the particles to its inner wall surface. These devices generally have the disadvantage of insufficient magnetic contact with the lubricating oil and are generally not easily removed from a used oil filter and transferred to a replacement filter.

Other patents disclose a permanent type magnet or magnets of cylindrical form in which a plurality of magnets are suspended by a rod-like member with spaces between the several magnets filled by magnetic or nonmagnetic material.

The principal disadvantage of these magnetic inserts has been they were directed toward a particular filter application and thus are not capable of use for retrofitting a plurality of the several types oil filter units presently in general use.

The most pertinent prior patent is believed to be U.S. Pat. No. 3,034,651 which discloses a magnetic cartridge for insertion into a hydraulic reservoir or oil containing pipe and comprises an open end nonmagnetic sleeve surrounding a plurality of longitudinally spaced permanent magnets with the spaces between the magnets filled by nonmagnetic material and the ends of the tubes sealed by nonmagnetic plugs. One end of the cartridge is attached to a rod for suspending the cartridge in oil.

The principal distinction of this invention over the above named patent is that the permanent magnets employed in the present invention are axially mounted on an elongated rod-like member having one threaded end portion easily connected with the oil filter supporting head of an engine to coaxially support the magnets within the oil filter. Other advantages of this filtering device, over the above patent, is the several magnets are maintained in spaced relation with respect to each other by magnetic flux repulsion of like poles wherein the spacing between magnets are not closed thus enhancing the magnetic force of the respective pole of each magnet so that magnetizable particles are attracted to the respective end poles of each magnet and the space between adjacent magnets wherein high velocity oil flow through the surrounding filter cannot dislodge the metallic particles from the magnets.

SUMMARY OF THE INVENTION

The magnetic filter is formed by a plurality of centrally bored cylindrical permanent magnets surrounding a rod-like support with like poles of the magnets juxtaposed so that magnetic flux repulsion maintains the magnets in spaced-apart relation. Diametrically the magnets are dimensioned to be freely inserted into the opening of an oil containing compartment, such as the mounting opening of the filter. The combined overall length of the spaced-apart several magnets is preferably slightly less than the depth of oil in the compartment being filtered. One end of the magnet supporting rod is axially connected with a threaded member for disposing the several magnets in a predetermined position in the oil containing compartment.

The principal objects of this invention are to provide a magnetic oil filtering unit formed by a plurality of bar-type permanent magnets which may be installed as original equipment on internal combustion engines, or the like, or as a retrofitting kit for engines in use in a manner exerting maximum magnetic attraction for magnetizable particles in oil which will prolong engine life.

Other objects are to increase the oil sump area between an oil filter and its mounting head for receiving one or more abrasive-type magnetically insulated bar-type permanent magnets held in place by a cup-like retainer for further increasing the magnetic field to attract and hold magnetizable particles from entering and clogging the oil filtering material of an oil filter.

BRIEF DESCRIPTION OF THE DRAWINGS

FIG. 1 is an elevational view of a preferred form of the magnetic filter unit;

FIG. 2 is a vertical cross sectional view of the magnetic filter unit in operative position in an engine oil filter attached to an engine oil filter head having additional magnetic filtering members interposed in an oil sump between the oil filter and its support head;

FIG. 3 is a fragmentary vertical cross sectional view similar to FIG. 2 of another embodiment of the filtering unit, illustrating the oil filter by dotted lines;

FIG. 4 is a view similar to FIG. 3 illustrating another embodiment of the filtering unit;

FIG. 5 is a fragmentary horizontal sectional view taken substantially along the line 5—5 of FIG. 4; and, FIG. 6 is a fragmentary cross sectional view, partially in elevation, illustrating another embodiment of the magnetic filtering unit when installed in an engine crankcase, or the like.

DESCRIPTION OF THE PREFERRED EMBODIMENTS

Like characters of reference designate like parts in those figures of the drawings in which they occur.

In the drawings:

The reference numeral 10 indicates a simplified conventional automotive engine oil filter secured to an oil filter head 12 mounted on an internal combustion engine 14. The head 12 is provided with an oil inlet bore 16 communicating with and supplied by oil from the engine oil pump, not shown. The bore 16 communicates with a downwardly open sump area 18 defined by a head flange 20. The head also includes an oil return bore 22 having its end portion opposite the engine enclosed by a downwardly open boss 24 concentric with the flange 20. The boss 24 is internally threaded and provided with an externally threaded sleeve 26 depending from the lower limit of the boss.

The oil filter 10 is generally cylindrical comprising an outer jacket 28 having a bottom wall 30 and a top wall 32 defining an oil and filter chamber or cavity 34. The top wall 32 is provided with a coaxial threaded opening 36 for normally receiving the depending end portion of the threaded sleeve 26 and connecting the oil filter to the head 12. The top wall 32 is provided with an annular sealing ring or gasket 38 normally sealing with the depending edge surface of the head flange 20 (FIG. 3). The filter top wall 32 is further provided with a circumferential row of oil inlet openings 40 spaced inwardly of its gasket 38 for admitting oil to be filtered from the sump 18 into the filter cavity 34. The filter 10 is further provided with a cylindrical filter element 42 spaced inwardly of the inner wall surface of the jacket 28 and surrounding a foraminated sleeve 44 depending from the filter top wall 32 outwardly of the top wall threaded bore 36 which defines a filtered oil return chamber 46 communicating with the depending end of the threaded sleeve 26 and oil return bore 22.

The above description forms no part of the present invention other than to set forth the combination with which the magnetic filtering unit, indicated by the numeral 50, is intended to be used.

The unit 50 comprises a plurality, five in the example shown, of centrally bored cylindrical bar-type permanent magnets 52 of selected length and diametrically dimensioned to be loosely received by the filter top plate opening 36. The magnets 52 slidably surround coaxially an elongated tube or rod 54 having a length greater than the combined length of the several magnets 52 and having a nut 56 at its depending end and threadedly engaged coaxially, at its upper end portion, with the depending end portion of a connector 58. The magnets 52 are disposed with like poles facing each other (FIG. 1) which by magnetic repulsion maintains the magnets in equally spaced relation and generates an outwardly bowed flux field indicated by the flux lines 59. This bulged out magnetic flux field increases the effective magnetizable particle filtering area of the oil adjacent the several magnets 52.

The term "magnet" as used herein refers to any commerically available permanent magnet having its poles located at opposing ends of the respective magnet.

As shown by FIG. 1, the connector 58 is provided with a hexagonal depending end portion 60, for the purposes presently explained, and is centrally bored, as at 62, from its end opposite the rod 54 to provide a filtered oil return passageway communicating with lateral bores 64 spaced above the upper limit of the magnet support rod 54. The upper end portion of the connector 58 is diametrically enlarged, as at 66, and counterbore for threadedly receiving the depending end portion of the filter head sleeve 26. The connector is further provided with external threads 68 between the enlarged portion 66 and lateral bores 64 for cooperatively receiving the filter top plate bore 36. The length of the filtering unit 50, between the external threads 68 and its depending end, is preferably slightly less than the depth of the filtered oil return chamber 46. The wrench flats formed by the portion 60 facilitates installing and removing the connector 58 from the head sleeve 26 for cleaning the filter unit as when replacing the oil filter 10.

The purpose of the connector 58 is to dispose the oil filter and its magnetic filter downwardly in spaced relation below the head flange 20 to increase the capacity of the sump 18 and receive one or more annular permanent magnets 70 arranged in superposed relation between the filter top plate gasket 38 and depending limit of the head flange 20. Annular seals or gaskets 72 are interposed between the permanent magnets 70 and between the uppermost magnet and flange 20. The magnets 70 and their gaskets are surrounded by a cup-like retainer 74 with a third gasket 76 sealing the inner bottom wall surface of the cup with the lowermost permanent magnet 70. The bottom wall of the retainer 74 is similarly provided with a plurality of oil passage apertures 77. The filter top wall gasket 38 seals with the depending surface of the cup bottom wall when the filter 10 is fully engaged with the connector threads 68.

Referring more particularly to FIG. 3, a modified form of the magnetic filter unit is indicated by the numeral 50' which is substantially identical with the magnet filter unit 50 modified by eliminating the connector enlargement 66 and extending the threads 68' to be of substantially equal length with respect to the length of the head sleeve 26. In this embodiment the head sleeve 26 is removed and the connector threads 68' are threadedly received by the head boss 24.

Referring now to FIG. 4, another embodiment of the filter unit is indicated by the numeral 80 similarly formed by a plurality of the magnets 52 longitudinally slidably surrounding a tube 82 having nuts 84 and 86 at its respective ends. The tube 82 loosely receives an elongated rod 88 having a length slightly less than the combined overall length of the depending portion of the oil return bore 22 and filtered oil return chamber 46. A nut 90, on the depending end of the rod 88, impinges a selected length of spring steel material 92 against the rod depending nut 86. Transversely the spring steel 92 is relatively narrow when compared with the diameter of the magnets 52 and its length is slightly greater than the inside diameter of the oil filter foraminated sleeve 44. The purpose of the spring steel member 92 is to center the depending end portion of the magnetic filter unit 80 within the filtered oil chamber 46. The magnetic filter unit 80 is inserted into the oil filter chamber 46 prior to installing the oil filter 10 on the head 12. When the oil filter 10 is connected with the head 12 the upper end portion of the rod 88 enters the depending end portion of the head return bore 22 and substantially centers the upper end portion of the magnetic filter unit 80 within the chamber 46. Prior to placing the oil filter 10 on the head, a resilient member, such as a spring 94, is placed around the rod 88 to bear against the depending end of the head sleeve 26 and uppermost magnet 52 and maintain the upper end of the magnetic filter unit 80 in spaced relation with respect to the depending end of the sleeve 26 to insure free flow of the return oil into the bore 22.

Referring also to FIG. 6, another embodiment of the magnetic filter unit, indicated by the numeral 95, is similarly formed by a plurality of the cylindrical magnets 52 surrounding an elongated flat head rod or screw 96 for installing the filter 95 in an oil pan 98 or other compartment containing oil to be filtered. The oil pan drain plug 100 is modified by centrally boring and countersinking the bore for receiving the screw head 102 with a lead gasket 104, or the like, utilized to seal the screw head with the drain plug bore. A nut 106, interposed between the lowermost magnet 52 and inner end of the plug 100, impinges the gasket 104 fluid tight.

Obviously the invention is susceptible to changes or alterations without defeating its practicability. Therefore, I do not wish to be confined to the preferred embodiment shown in the drawings and described herein.

I claim:

1. In an engine oil filter system having an oil filter support head provided with a centrally bored boss for coaxial sealing connection with one end of a cylindrical oil filter having a central cylindrical chamber open toward said boss, the improvement comprising:

an elongated tube loosely received by the filter chamber;

a plurality of permanent magnets surrounding said tube in spaced-apart relation with like poles of the magnets juxtaposed;

an elongated rod extending through said tube and projecting, at one end portion, into the bore of said boss;

fastener means on the rod at respective ends of the tube for preventing longitudinal movement of said rod relative to said tube and maintaining the respective endmost magnet on the adjacent end portion of said tube; and, a spring having a width less than its length and having a length at least slightly greater than the inside diameter of the filter chamber and secured medially its ends by said fastener means adjacent the other end portion of said rod for centering the adjacent end of said tube in the filter chamber.

2. The combination according to claim 1 and further including:

resilient means interposed between said tube and said boss for axially biasing said tube toward the end of said oil filter opposite said head.

* * * * *